Oct. 2, 1951

D. E. JONES ET AL

CRYSTAL CONTACTS OF WHICH ONE ELEMENT IS MAINLY SILICON

Original Filed Aug. 10, 1942

2,569,892

INVENTORS:
DOUGLAS ENFIELD JONES
CHARLES ERIC RANSLEY
JOHN WALTER RYDE
STANLEY VAUGHAN WILLIAMS, DECEASED,
BY FRANCES MABEL WILLIAMS, EXECUTRIX
BY
Harry C. Page
ATTORNEY Patented Oct. 2, 1951

2,569,892

UNITED STATES PATENT OFFICE 2,569,892

CRYSTAL CONTACTS OF WHICH ONE ELEMENT IS MAINLY SILICON

Douglas Enfield Jones, Harrow, Charles Eric Ransley, Sudbury, and John Walter Ryde, London, England, and Stanley Vaughan Williams, deceased, late of Kenton, England, by Frances Mabel Williams, executrix, Kenton, England, assignors, by mesne assignments, to Hazeltine Research, Inc., Chicago, Ill., a corporation of Illinois Original application August 10, 1942, Serial No. 454,290. Divided and this application March 20, 1947, Serial No. 736,094. In Great Britain August 20, 1941

16 Claims. (Cl. 250—31)

Figure 1:
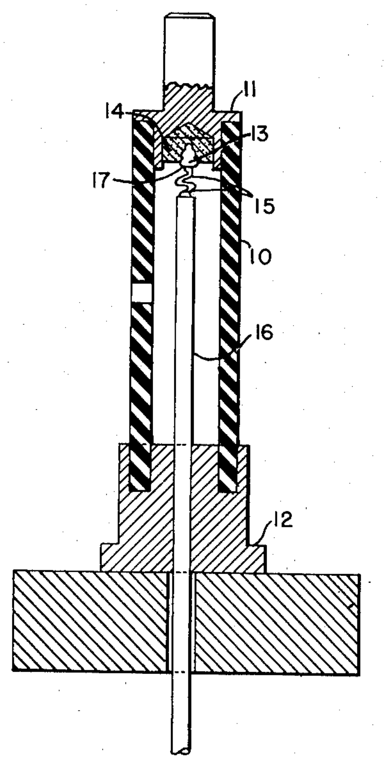

This invention relates to silicon-crystal elements for wave-signal translating devices of the type comprising a semiconducting crystal and a metal (usually a metal point) in contact with it. Such contacts can be used as rectifiers of alternating current or as "mixers," that is to say as nonlinear impedances to which are applied an oscillation of frequency $f_1$ and another oscillation of frequency $f_2$, so that oscillations are produced having frequencies $(pf_1 \pm qf_2)$, where $p$ and $q$ are integers.

The present application is a division of application Serial No. 454,290, filed August 10, 1942, now Patent 2,419,561, granted April 29, 1947, and entitled "Crystal Contacts of Which One Element Is Mainly Silicon."

Objects of the invention are to provide improved silicon-crystal contact elements and wave-signal translating devices embodying such crystals that are more uniform or more efficient or both than those of the said type known hitherto. The uniformity aimed at means that the electrical characteristic of the contact should be as nearly as possible independent of the position on the crystal of a metal point forming the other element of the contact. Efficiency generally requires a high ratio of impedance in one direction (reverse impedance) to impedance in the other direction (forward impedance). It may also require that the absolute values of the forward impedance should be high or, alternatively, that they should be low. It may also require that the forward direction should be that in which positive charge flows from the crystal to the metal (positive contact) or that it should be that in which negative charge flows from the crystal to the metal (negative contact).

When the contact is used as a mixer, efficiency requires that the signal-to-noise ratio should be relatively high. Efficiency also requires that the performance of the contact judged by any of the foregoing criteria should deteriorate as little as possible with use or with age.

In accordance with the present invention, a silicon-crystal element for a wave-signal translating device comprises a solid solution of silicon substantially free from impurities usually present in commercial silicon and a predetermined small amount of at least one of the two metals aluminium and beryllium, the ratio of the number of atoms of metal to the number of atoms of the silicon in the product having a value between limits of the order of $^1/_{400}$ and $^1/_{50}$.

Silicon is one of the semiconductors most widely used in crystal contacts. We have found that the said objects of the invention can be attained by introducing into substantially pure silicon a small proportion of aluminium or beryllium or both of these metals which form a solid solution with silicon and have extremely stable oxides. The term "small" implies that the ratio of the number of atoms of the additive metal to the number of atoms of silicon in the product is not greater than $^1/_{50}$. Impurities, such as iron, which are often present in commercial silicon are generally undesirable and should be removed before the additive metal is introduced.

If the starting material is the commercial silicon at present available, the introduction of the selected additive metal must be preceded by a purification. This purification can be effected by subjecting commercial silicon to the process described by N. P. Tucker in the Journal of the Iron and Steel Institute, vol. CXV(1), p. 412, 1927. This process removes only those impurities that are not contained in the silicon crystals, but occur as an additional phase, usually in the interstices between the silicon crystals. Commercial silicon is usually prepared by cooling a melt slowly; then practically all the deleterious impurities are in the interstices and can be removed by Tucker's process. If that process fails with any sample of silicon, it is probably because the silicon has been quenched rapidly; then the silicon should be re-melted and cooled slowly before it is subjected to the Tucker process.

The additive metal is preferably introduced by melting a mixture of the pure silicon and the additive. During this process care must be taken not to introduce undesired impurities. Those that might be derived from the air (a small quantity of oxygen is not necessarily deleterious) can be avoided by melting in a suitable atmosphere; the most suitable we have found is a vacuum, that is to say residual gas at a pressure of not more than 0.001 mm. of mercury. But it is difficult, or perhaps impossible, to find any crucible to contain the melt that does not react slightly with the melted silicon. This difficulty can be overcome by using a crucible consisting of or lined with pure beryllia; for then the only impurity introduced from the crucible is beryllium, which is not harmful but beneficial. It might be possible to introduce from the crucible all the additive metal characteristic of the invention; but in view of patent application Serial No. 446,310, filed June 8, 1942, now Patent 2,419,966, granted May 6, 1947, we exclude from the scope of this invention any process of manufacturing the mainly silicon element of a crystal contact which comprises only the steps mentioned in the claims of the specification of that application. If therefore the first step in the process consists in "grinding relatively impure silicon to a fine powder and treating it with chemical reagents so as to produce a relatively pure product," the process will not lie within the scope of the present invention unless part at least of the additive metal is derived from a source other than a container in which the silicon is melted. But it is to be understood that the introduction of additive from the container is always to be taken into account when the amount of additive to be introduced from other sources is considered. Whether additive is or is not introduced from the container, that otherwise introduced may be aluminium or beryllium or a mixture of the two.

In order that the resulting crystals may have the best qualities, it is generally necessary and always desirable that, after the introduction of the additive, the crystals should be subjected to an appropriate treatment modifying their surface. One part of this process is a controlled oxidation; this part can be omitted only if the necessary oxidation has been effected during the melting or the cooling of the melt. We have occasionally succeeded in producing satisfactory results by this method; but it is difficult to control, and we greatly prefer to remove any surface oxide from the cooled melt with hydrofluoric acid and then to heat the product in a definitely oxidizing atmosphere. Further we prefer not to attempt to produce the optimum surface oxidation by the heating alone; it is usually better to oxidize the surface somewhat more than is required and then to remove some (but not all) the layer of oxide with hydrofluoric acid.

Other surface treatments are also permissible and often desirable. Thus it is usually preferable to polish the fragments of the melt, or at least that part of them which is to contact with the metal point, before the controlled oxidation. Again, crystals are often soldered into metal capsules; then it is desirable to plate with metal that part of the crystal that is to lie in the capsule, in order that the solder may adhere to it.

Figure 2:
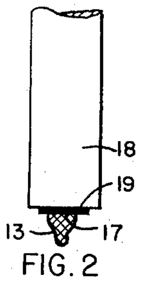
Figure 3:
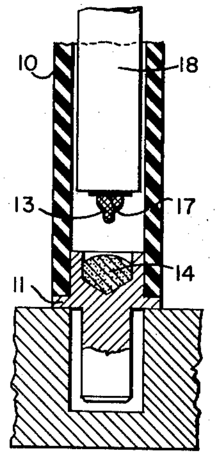

One method of performing the invention will now be described by way of example, with reference to the accompanying drawing, in which Fig. 1 shows the completed crystal contact device; Fig. 2 shows a silicon fragment temporarily mounted in readiness for a step in the process of preparation; and Fig. 3 illustrates the step of mounting the same element in a capsule.

Referring to Fig. 1, the completed crystal contact device consists of a ceramic tube 10 capped at its ends respectively by a metal capsule 11 and a bush 12. The crystal body 13 is set in the capsule 11 by means of a low-melting alloy 14. One or more metallic contact elements 15 carried by a metal rod 16 co-operate with a prepared face 17 of the crystal body, the rod 16 being held fast in the bush 12.

The starting material is commercial silicon which has been ground and passed through a 200 mesh sieve; the material contained the following metals in the following amounts reckoned as oxides: ($Al_2O_3$+$ZrO_2$) 1.01%, $Fe_2O_3$ 0.96%, $TiO_2$ 0.021%, MnO 0.08%, BaO 0.03%, CaO 1.13%, CuO 0.002%, MgO less than 0.002%. In step (1) this material was purified by the aforesaid method described by Tucker. The resulting material had the following composition:

($Al_2O_3$+$ZrO_2$) 0.03%, $Fe_2O_3$ less than 0.005%, $TiO_2$ less than 0.0005%, MnO less than 0.001%, BaO less than 0.003%, CaO 0.008%, CuO 0.001%, MgO less than 0.002%. In step (2), the purified material is melted in vacuo (pressure less than 0.001 mm. of mercury) in a pure beryllia crucible, together with aluminium in an atomic proportion of 1 Al to 400 Si. The beryllia was fired to 1400° C., ground and washed with nitric acid before being made into a crucible.

In a further step (3) a fragment of the cooled melt has a plane part of its surface highly polished by any of the processes customary among metallurgists, for example grinding with emery of increasing fineness and finally polishing with alumina or magnesia or both. In a further step (4) the whole surface of the fragment is then dipped for 5 minutes into commercially pure 40% hydrogen fluoride diluted with an equal quantity of water. The main purpose of this treatment with hydrofluoric acid is to prepare the polished surface for the subsequent oxidation; accordingly it is not necessary, though it is usually convenient, that the unpolished part of the surface should be dipped.

In a further step (5) the necessary surface oxidation is performed. For this purpose the body resulting from step (4) is placed on a flat silica tray (together possibly with other bodies at the same stage of preparation) and introduced into a silica tube furnace filled with air at a region thereof maintained at 1050° C. There is a definite optimum temperature for this treatment; the temperature should be observed, e. g. by a thermocouple, and kept as near to 1050° C. as possible. The body is maintained in the said region for 2 hours and then allowed to cool. An atmosphere of oxygen at a controlled pressure may be substituted for the air in the furnace; then the time of heating will depend on the pressure of the oxygen.

In a further step (6) the treatment given in step (4) is repeated. Now part of its object is to prepare the unpolished part for step (7); accordingly the unpolished part must be dipped. In the process now being described in detail the dipping of the polished part is equally necessary, in order that part of the oxide layer formed in step (5) should be removed; but, as explained heretofore, it might possibly not be in a modification of the process. After the dipping, the body is washed with water.

In a further step (7) a metallic layer is deposited on some or all of the unpolished surfaces. The layer must not be deposited on the polished surface; accordingly as shown in Fig. 2, this is first protected by coating the flat end of a rod 18 with a layer of adhesive 19, which may be the material known as monostyrene, and pressing the polished surface 17 of the body 13 against this layer. The exposed unpolished surface is then coated with copper by a method described by Bedel in Comptes Rendus, vol. 192 (1931), page 802. It consists merely in dipping the surface for 5 to 10 seconds into a solution of cuprous oxide in 20% hydrofluoric acid; the copper layer deposited may be subsequently thickened by electrolysis. Copper is not deposited on tungsten or molybdenum by this process; accordingly the rod 18 may be conveniently of tungsten or molybdenum. The coated surface is then washed and dried. The body can then be mounted in the metal capsule 11 by means of solder or some other suitable low-melting alloy intervening between the metal layer and the capsule. For this purpose the rod 18 is inserted in the tube 10 so that the crystal enters the molten alloy 14 in the capsule 11, which is temporarily placed on an end of the tube. After the alloy has set, the rod 18 is detached from the body and the polished surface of the body cleaned from the adhesive by washing with a suitable solvent, such as benzene or ethyl acetate. The mounted crystal body is then ready for final assembly into the structure shown in Fig. 1.

A suitable metal element to co-operate with a crystal so prepared is the end of a tungsten wire 0.2 mm. in diameter, this end being sheared off along the cleavage plane which lies at about 45° to the axis of the wire. The pressure between the wire and the polished crystal surface may be 10–15 gm. weight. If the contact is tested with an applied D. C. E. M. F. of 0.7 volt, then after little searching, a point can be found where the forward impedance is about 200 ohms, and the ratio of reverse to forward impedance is at least 30. With a lighter pressure a ratio of 100 or more can usually be obtained, but then the forward impedance is greater. The contact will usually stand without appreciable deterioration the passage across it, for a period of 10 to 60 seconds, of a current (limiting current) of 40 to 80 ma. Comparable average figures for the commercial silicon that was the starting material, polished as described hereinbefore but not treated otherwise, are forward impedance 180 ohms, ratio of reverse to forward impedance 5, limiting current 5–20 ma.

If a lower forward impedance is required, the pressure between crystal and wire may be increased to 30–50 gm. weight. A forward impedance in the neighborhood of 100 ohms can then be obtained, but the average ratio of reverse to forward impedance is likely to be 10–20, and the limiting current 30–60 ma.

If a high limiting current is not so important as the impedance characteristic, the aforesaid sheared tungsten point may be replaced by a fine tungsten point obtained by the well-known process of etching with Langmuir's solution.

One advantage of crystals prepared according to the invention is that they are so uniform that it is often possible to locate two metal points ("whiskers") in parallel on the same crystal without adjusting them separately, as shown in Fig. 1, and yet to obtain in this way an improved characteristic. The improvement is usually not so much in the impedance as in the limiting current that the contact will stand without deterioration. No novelty is claimed for the bare suggestion that whiskers on the same crystal may be connected in parallel; but, so far as we are aware, no disclosure has been made before how crystals might be prepared that are at once of high efficiency and also so uniform that the suggestion is practically useful.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A silicon-crystal element for a wave-signal translating device comprising, a solid solution of silicon substantially free from impurities usually present in commercial silicon and a predetermined small amount of at least one of the two metals aluminium and beryllium, the ratio of the number of atoms of metal to the number of atoms of said silicon in the product having a value of the order of 1/400.

2. A silicon-crystal element for a wave-signal translating device comprising, a solid solution of silicon substantially free from impurities usually present in commercial silicon yet having impurities in the form of metallic oxides totaling of the order of 0.05 per cent and a predetermined small amount of at least one of the two metals aluminium and beryllium, the ratio of the number of atoms of metal to the number of atoms of said silicon in the product having a value between limits of the order of 1/400 and 1/50.

3. A silicon-crystal element for a wave-signal translating device comprising, a solid solution of silicon having a purity of the order of 99.95 per cent. and a predetermined small amount of at least one of the two metals aluminium and beryllium, the ratio of the number of atoms of metal to the number of atoms of said silicon in the product having a value between limits of the order of 1/400 and 1/50.

4. A silicon-crystal element for a wave-signal translating device comprising, a solid solution of silicon substantially free from impurities usually present in commercial silicon and a predetermined small amount of at least one of the two metals aluminium and beryllium, the ratio of the number of atoms of metal to the number of atoms of said silicon in the product having a value between limits of the order of 1/400 and 1/50.

5. A silicon-crystal element for a wave-signal translating device comprising, a solid solution of silicon of a purity in excess of 99 per cent and a predetermined small amount of at least one of the two metals aluminium and beryllium, the ratio of the number of atoms of metal to the number of atoms of silicon in the product having a value between limits of the order of 1/400 and 1/50.

6. A silicon-crystal element for a wave-signal translating device comprising, a solid solution of silicon substantially free from impurities usually present in commercial silicon and a predetermined small amount of at least one of the two metals aluminium and beryllium, the ratio of the number of atoms of metal to the number of atoms of said silicon in the product having a value between limits of the order of 1/400 and 1/50, said element having a hydrofluoric acid treated surface adapted to be contacted by a metallic element included in said translating device.

7. A silicon-crystal element for a wave-signal translating device comprising, a solid solution of silicon substantially free from impurities usually present in commercial silicon and a predetermined small amount of at least one of the two metals aluminium and beryllium, the ratio of the number of atoms of metal to the number of atoms of said silicon in the product having a value between limits of the order of 1/400 and 1/50, said element having an oxidized surface adapted to be contacted by a metallic contact element included in said translating device.

8. A silicon-crystal element for a wave-signal translating device comprising, a solid solution of silicon substantially free from impurities usually present in commercial silicon and a predetermined small amount of at least one of the two metals aluminium and beryllium, the ratio of the number of atoms of metal to the number of atoms of said silicon in the product having a value between limits of the order of 1/400 and 1/50, said element having a surface oxidized under controlled oxidizing conditions and adapted to be contacted by a metallic contact element included in said translation device.

9. A silicon-crystal element for a wave-signal translating device comprising, a solid solution of silicon substantially free from impurities usually present in commercial silicon and a predetermined small amount of at least one of the two metals aluminium and beryllium, the ratio of the number of atoms of metal to the number of atoms of said silicon in the product having a value between limits of the order of 1/400 and 1/50, said element having a surface oxidized in an atmosphere of oxygen for several hours at approximately 1050° centigrade and adapted to be contacted by a metallic contact element included in said translating device.

10. A silicon-crystal element for a wave-signal translating device comprising, a solid solution of silicon substantially free from impurities usually present in commercial silicon and a predetermined small amount of at least one of the two metals aluminium and beryllium, the ratio of the number of atoms of metal to the number of atoms of said silicon in the product having a value between limits of the order of 1/400 and 1/50, said element having a surface oxidized in air for approximately two hours at approximately 1050° centigrade and adapted to be contacted by a metallic contact element included in said translating device.

11. A silicon-crystal element for a wave-signal translating device comprising, a solid solution of silicon substantially free from impurities usually present in commercial silicon and a predetermined small amount of at least one of the two metals aluminium and beryllium, the ratio of the number of atoms of metal to the number of atoms of said silicon in the product having a value between limits of the order of 1/400 and 1/50, said element having a polished, oxidized and hydrofluoric acid treated surface adapted to be contacted by a metallic contact element included in said translating device.

12. A silicon-crystal element for a wave-signal translating device comprising, a solid solution of silicon substantially free from impurities usually present in commercial silicon and a predetermined small amount of at least one of the two metals aluminium and beryllium, the ratio of the number of atoms of metal to the number of atoms of said silicon in the product having a value between limits of the order of 1/400 and 1/50, said element having a surface initially oxide coated but so treated with hydrofluoric acid that the thickness of said oxide coating has been at least partially reduced.

13. A silicon-crystal element for a wave-signal translating device comprising, a solid solution of silicon substantially free from impurities usually present in commercial silicon and a predetermined small amount of at least one of the two metals aluminium and beryllium, the ratio of the number of atoms of metal to the number of atoms of said silicon in the product having a value between limits of the order of 1/400 and 1/50, said element having a first surface portion adapted to be contacted by a metallic contact element included in said translating device and having a second and metallized surface portion adapted to be electrically connected to a second metallic element of said device.

14. An electrical-crystal contact device comprising, a semiconducting crystal contact element comprised of silicon which contains a determinate small quantity of at least one of the two metals aluminium and beryllium in solid solution but which is otherwise substantially free from metallic impurities such as are usual in commercial silicon, the ratio of the number of atoms of metal to the number of atoms of said silicon in the product having a value between limits of the order of 1/400 and 1/50, and a metallic contact element co-operating with a polished and oxidized surface of said crystal element.

15. An electrical-crystal contact device comprising, a semiconducting crystal contact element comprised of silicon which contains an addition of at least one of the two metals aluminium and beryllium in solid solution in the proportion of one atom of the additive metal to not less than 50 atoms of silicon but which is otherwise substantially free from metallic impurities such as are usual in commercial silicon, a metal member to which a copper-coated surface of said crystal element is soldered, and a metallic contact element pressed against a polished and oxidized surface of said crystal element.

16. An electrical-crystal contact device comprising, a semiconducting crystal contact element comprised of silicon which contains in solid solution a quantity of additive metal such that the ratio of the number of atoms of said additive metal to the number of atoms of silicon in the product is not greater than 1/50, but which is otherwise substantially free from the metallic impurities usual in commercial silicon, and a metallic contact element co-operating with a polished, oxidized and etched surface of said crystal element.

DOUGLAS ENFIELD JONES.
CHARLES ERIC RANSLEY.
JOHN WALTER RYDE.
FRANCES MABEL WILLIAMS,
*Executrix of the Estate of Stanley Vaughan Williams, Deceased.*

REFERENCES CITED

The following references are of record in the file of this patent:

UNITED STATES PATENTS

| Number | Name | Date |
|---|---|---|
| 1,571,020 | McGowan | Jan. 26, 1926 |
| 2,402,582 | Scaff | June 25, 1946 |
| 2,402,839 | Ohl | June 25, 1946 |
| 2,419,561 | Jones et al. | Apr. 29, 1947 |